G. F. HOLLIS.
BRAKE LINING.
APPLICATION FILED MAR. 6, 1917.
1,304,481.
Patented May 20, 1919.
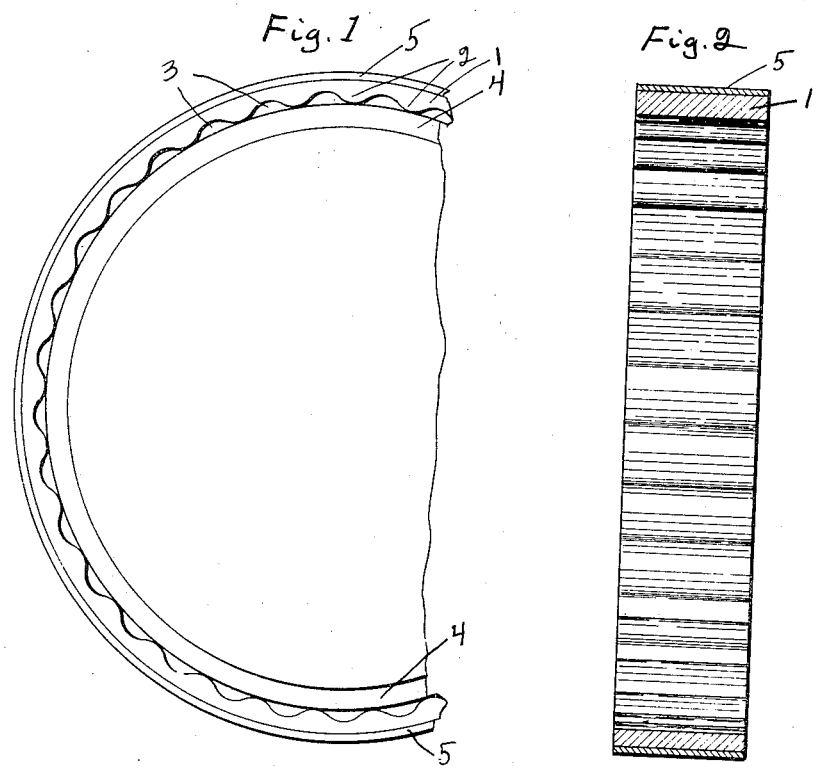
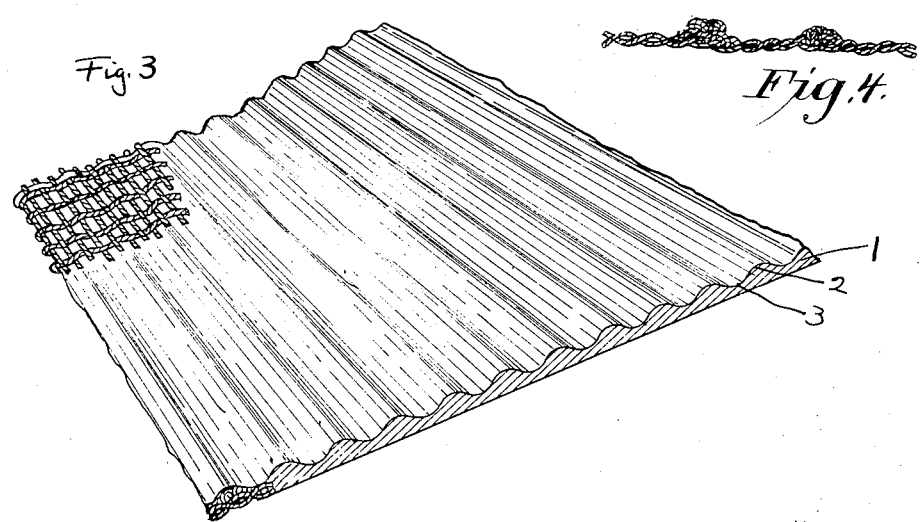
WITNESSES.
Walter H. Roe
George Francis Hollis
INVENTOR.
BY J. O. Baily Brown
HIS ATT'Y.

UNITED STATES PATENT OFFICE.

GEORGE FRANCIS HOLLIS, OF PITTSBURGH, PENNSYLVANIA.

BRAKE-LINING.

1,304,481.

Specification of Letters Patent.   Patented May 20, 1919.

Application filed March 6, 1917. Serial No. 152,499.

*To all whom it may concern:*

Be it known that I, GEORGE FRANCIS HOLLIS, a resident of Pittsburgh, in the county of Allegheny and State of Pennsylvania, have invented a new and useful Improvement in Brake-Linings, of which the following is a specification.

This invention relates to brake linings, and is particularly designed for use in that class of brakes comprising a drum and tension band therearound.

More specifically it is intended to provide a lining for friction brake members composed of a non-combustible material such as asbestos, which may be easily inserted or removed and so formed that the gripping surface will not blister or chip. This necessitates a lining which may be thoroughly lubricated, *i. e.*, one in which a film of oil can be maintained between the brake members at all times.

These and other objects are attained by means of the construction illustrated in the accompanying drawings, wherein Figure 1 represents a partial side elevation of the particular lining herein described as applied to a vehicle wheel brake; Fig. 2 is a vertical section through the brake band and lining; and Fig. 3 is a perspective view of a portion of the brake lining removed from the band, showing the wearing surface. Fig. 4 is a view showing the woven fabric detached.

It has been found that there is trouble in the case of brakes for automobile wheels and similar apparatus because there is a tendency for the brake to grip quickly, locking the wheel, then slip, grip again, etc., instead of producing a steady gripping action without the chattering or jarring experienced from the action first noted. This is particularly true in the case of light automobiles.

This chattering action is caused by improper lubrication of the brake lining, allowing the entire braking surface to stick to the wheel drum and then when the tension becomes too great, allowing the drum to slip, stick again, and so on. This quickly burns out the brake lining, by causing scales on the surface thereof. In addition, the intermittent braking effect produces vibration in the machine, and is hard on the mechanism.

These objections are avoided by my improved brake lining, which consists of providing the frictional surface of the lining member 1 with corrugations comprising transverse ridges 2 and intervening depressions 3. This construction involves the weaving of the brake lining by a method to produce the corrugated surface. This may be done by well known processes of weaving when the lining is fabricated from a material like asbestos, or if the lining is a composition it may be molded or pressed or stamped to shape. If necessary cores may be used in the body of the brake lining to secure the ridges 2. The essential thing is to have corrugations that will maintain their identities under pressure.

As here shown, the lining is applied to an automobile brake mechanism comprising a drum 4 fixed on the automobile wheel or axle in a manner well known and not here illustrated. About this drum a steel tension band 5 extends, fixed at one end and attached to a pedal or other brake lever connection at the other end, in the ordinary manner. Inside this band the lining 1 is placed.

The depressions in this lining hold any suitable lubricant while the friction is applied by the intervening ridges. This arrangement insures the gripping by small sections of the lining instead of by a large area. These ridges will not burn or scale, as the adjacent lubricant prevents the sticking of any large patch of surface to the drum. At the same time, the brake is effective because there is increased pressure on the ridges compensating for the loss of surface.

This lining absolutely prevents the burning out of brakes, and rapid deterioration by reason of scaling, as well as the catching and slipping action, which is so objectionable in present devices.

I claim:—

1. As an article of manufacture, a non-metallic brake lining having alternating ridges and depressions extending across the wearing surface, the entire lining being homogeneous.

2. As a new article of manufacture, a brake lining of homogeneous material woven to form continuous corrugations across the wearing surface of the lining.

In testimony whereof, I have hereunto set my hand.

GEORGE FRANCIS' HOLLIS.